April 13, 1926.  1,580,121

N. L. DOOTSON

AUTOMOBILE SPRING STRUCTURE

Filed May 4, 1925

Inventor
N. L. Dootson,
By Clarence O'Brien
Attorney

UNITED STATES PATENT OFFICE.

NORMAN LESLIE DOOTSON, OF SAN FRANCISCO, CALIFORNIA.

AUTOMOBILE SPRING STRUCTURE

Application filed May 4, 1925. Serial No. 27,929.

*To all whom it may concern:*

Be it known that I, NORMAN LESLIE DOOTSON, a citizen of the United States, residing at San Francisco, in the county of San Francisco and State of California, have invented certain new and useful Improvements in an Automobile Spring Structure, of which the following is a specification.

This invention relates broadly to an improved automobile spring structure wherein a conventional leaf spring is disposed below the chassis frame, and under ordinary circumstances, connected at its ends with the adjacent bar of the frame.

The present invention however has more particular reference to an auxiliary means or shock absorber which is intended to be located between, and connected with the chassis and leaf spring respectively.

Within my conception the invention is illustrated by a plurality of different embodiments, and generally considered, it may be said that the invention comprises a shock absorber which is interposed between the adjacent ends of a chassis bar, and leaf spring, portions of the absorber being directly and pivotally connected with the bar and spring, and there being at least one coil spring in association with these portions to render them active in both directions of movement, whereby to render the device effective to yieldably resist shocks, both up and down.

The specific embodiments of this broad generic structure will be set out in order in the following description and drawing.

In the accompanying drawing forming a part of the application and in which like numerals are employed to designate like parts throughout the same:

Figures 3 to 6 inclusive are diagrammatic or side views of a plurality of other different embodiments of the invention.

Figure 1:
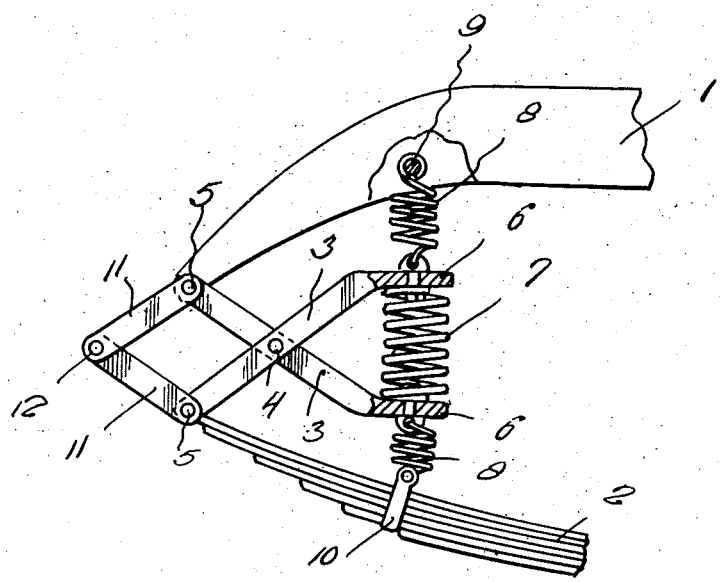
Figure 1 is a side view in section and elevation of one embodiment of the invention.

Referring first to Figure 1 it will be seen that the reference character 1 designates one side bar of an automobile chassis frame, and the reference character 2 designates one end portion of an ordinary leaf semi-elliptic spring which is ordinarily fastened at its center to the adjacent axle. In accordance with my idea the ends of the spring, and the chassis bar are spaced apart to accommodate the shock absorber shown. In this instance the shock absorber comprises a pair of duplicate arms 3 pivotally connnected together between their ends as at 4. The arms at one end are pivoted as at 5 to the corresponding ends of the chassis bar and main spring. The opposite ends of the arms are bent angularly and flattend as indicated at 6, and a fairly heavy coiled spring 7 is located between and connected with these flattened ends. Supplemental springs 8 are interposed between the flattened ends 6 and the upper spring is connected with a cross pin 9 on the chassis bar while the lower spring is connected with a clip 10 on the leaf spring 2. Acting in conjunction with these cross arms is a pair of links 11 pivoted together as at 12 and having their other ends connected to the same pivots 5 already described.

Figure 2:
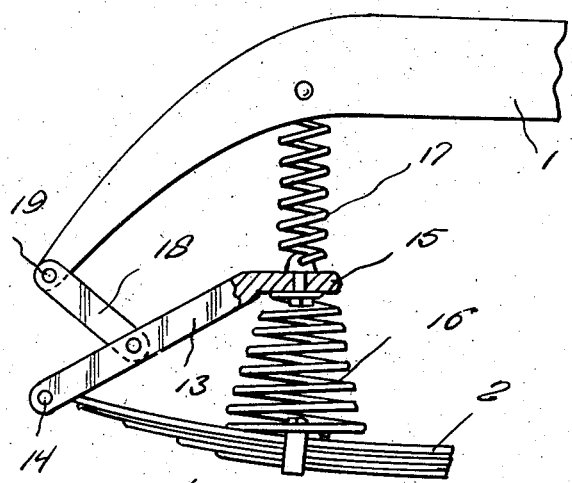
Figure 2 is a similar view of another embodiment.

In Figure 2, I show but a single arm 13, this being pivoted at 14 to one end of the leaf spring 2 and having its opposite end flattened and disposed horizontally as at 15, and located equi-distant between the chassis bar and leaf spring. A comparatively large and strong helical spring 16 is connected with the leaf spring 2 and the arm while a comparatively weaker spring 17 is connected with the arm and chassis bar. A short link 18 is pivoted to the intermediate portion of the arm 13 and also pivoted as at 19 to the end of the chassis bar.

Figure 3:
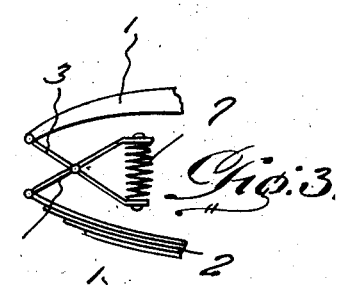

Observing Figure 3 it will be seen that this is substantially identical with the showing made in Figure 1 except that the links 11 and auxiliary springs 8 are eliminated. Inasmuch as the other details are the same, the same reference characters are applied to corresponding parts.

Figure 4:
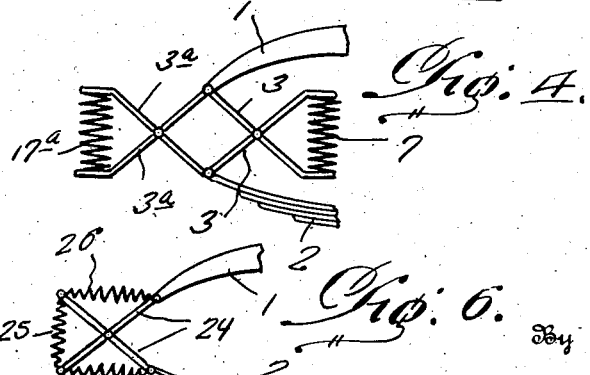

Figure 4 shows the same structure seen in Figure 3, but includes auxiliary means. The corresponding details of Figure 3 bear the same reference characters and need not be again described. In this embodiment however, we find auxiliary crossed arms 3ª pivoted at one end to the chassis bar and leaf spring respectively, and having a coiled spring 17ª interposed between their opposite ends and appropriately fastened in place.

Figure 5:
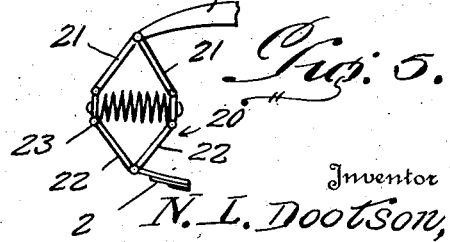

Referring now to Figure 5 it will be seen that a toggle 20 is employed, the entire toggle being interposed between the chassis bar 1, and the leaf spring 2. One divergent pair of links 21 are connected with the chassis bar and the remaining pair 22 are connected with the leaf spring, there being a single horizontally disposed coiled spring 23 located between the pairs of links at the center of the toggle.

Figure 6:
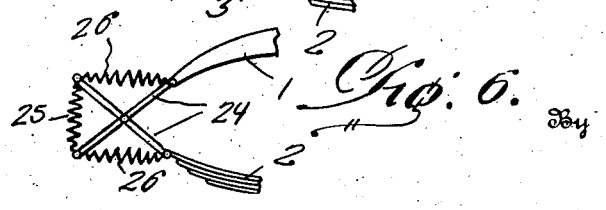

Finally, in Figure 6 we see a pair of crossed members 24 pivotally connected between their ends and extending outwardly beyond the chassis bar and the leaf spring. These members are connected at one end with the chassis bar and spring, while a coiled spring 25 is interposed between and connected with the opposite end. In addition, two other coiled springs 26 are connected at their opposite ends with the last named ends of the members and with the chassis bar and leaf spring pivots respectively.

From the foregoing description it will be observed that I have evolved and produced a novel shock absorber for disposition between a leaf spring and a chassis bar, the construction being such that the principle of operation is substantially the same in all embodiments of the invention. It is thought that persons familiar with devices of this kind will be able to obtain a clear understanding by considering the detailed description in connection with the drawings. Therefore, a more lengthy description will be omitted.

While the preferred embodiments of the invention have been shown and described, it is to be understood that minor changes coming within the field of invention claimed may be resorted to if desired.

Having thus described the invention, what I claim as new is:—

In a vehicle spring suspension structure of the class described, a chassis bar, a leaf spring disposed beneath said bar, the adjacent and corresponding ends of said spring and bar being spaced apart, and shock absorbing means located in the space between said ends, said means comprising an arm pivoted at its outer end to an adjacent end of said spring, the opposite end of the arm being bent angularly to dispose it in spaced parallelism to the end portion of the bar and spring, coiled springs connected with the inner end portion of the arm and with the leaf spring and bar respectively, and a relatively short link pivoted at one end to the end of said bar and at its opposite end to the intermediate portion of said arm.

In testimony whereof I affix my signature.

NORMAN LESLIE DOOTSON.